B. S. FORD.
COTTON BLOCKING MACHINE.
APPLICATION FILED OCT. 19, 1920.
1,390,114.
Patented Sept. 6, 1921.
2 SHEETS—SHEET 2.
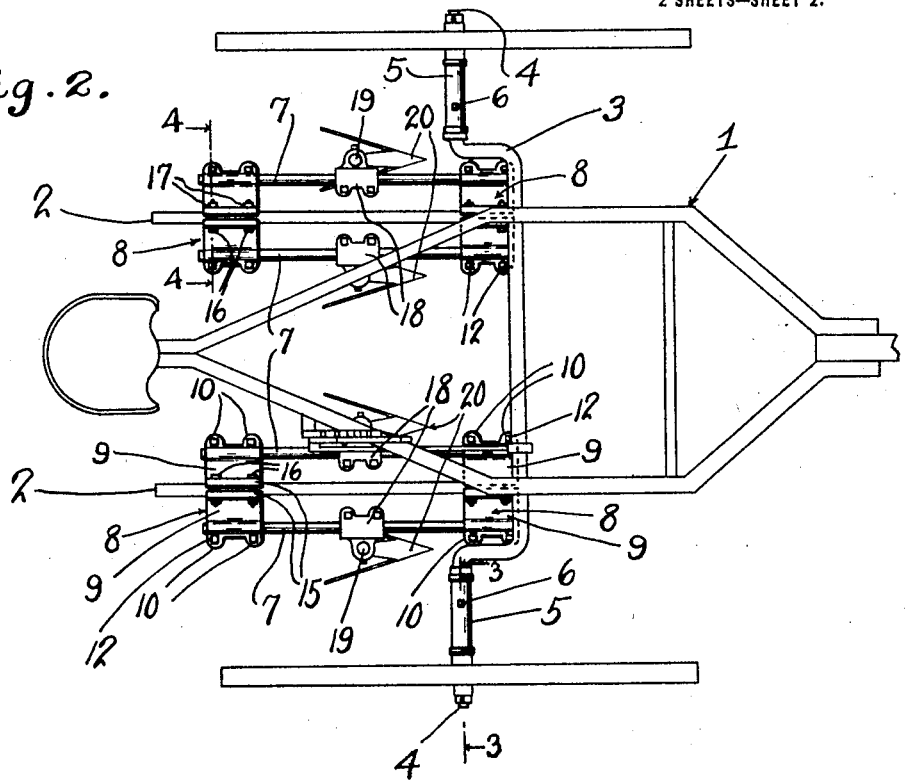
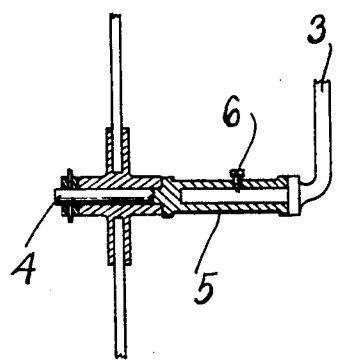
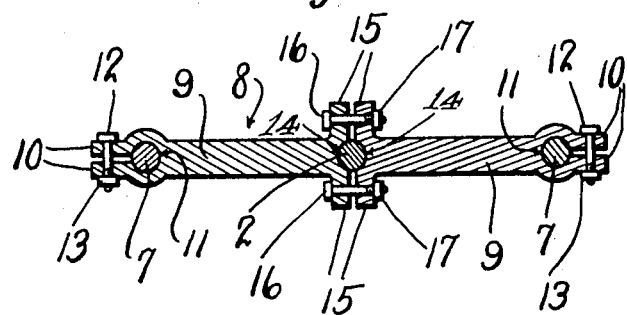
WITNESS:
L. B. James
B. S. Ford
INVENTOR
By Victor J. Evans
ATTORNEY

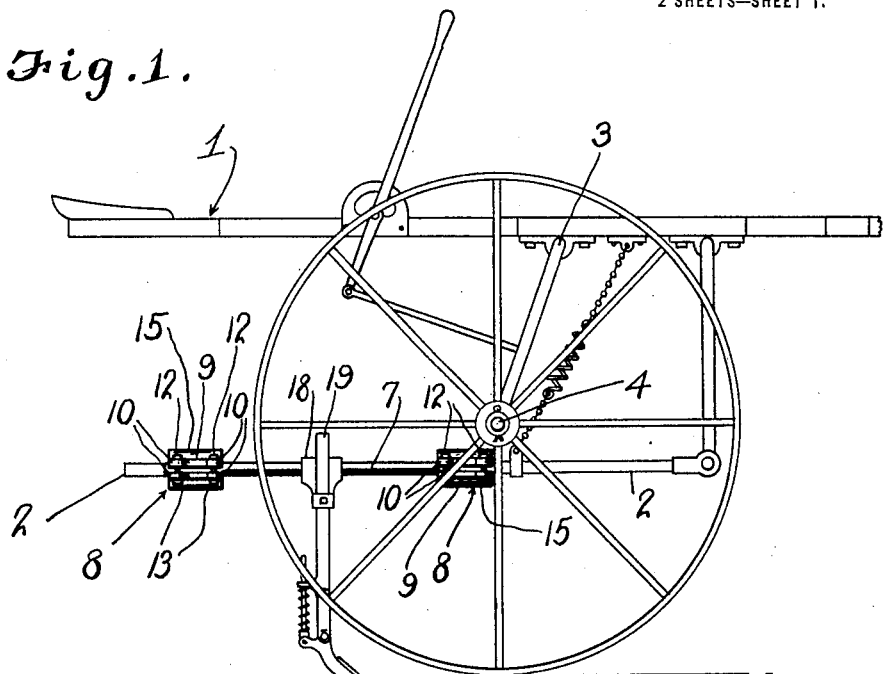
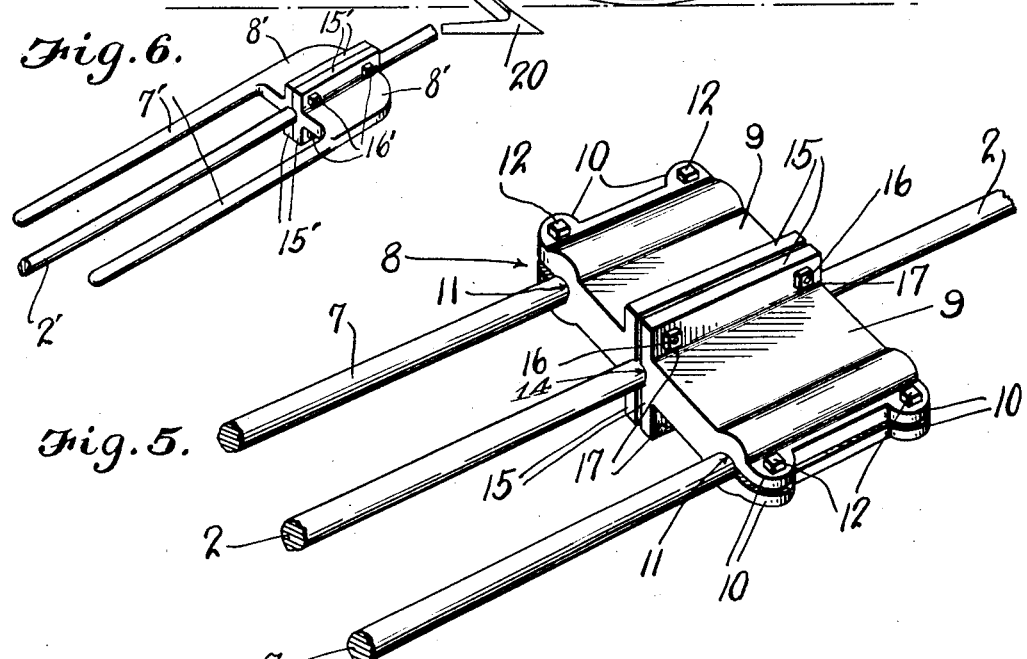

UNITED STATES PATENT OFFICE.

BARNIE S. FORD, OF COLEMAN, TEXAS.

COTTON-BLOCKING MACHINE.

1,390,114. Specification of Letters Patent. Patented Sept. 6, 1921.

Application filed October 19, 1920. Serial No. 417,890.

*To all whom it may concern:*

Be it known that I, BARNIE S. FORD, a citizen of the United States, residing at Coleman, in the county of Coleman and State of Texas, have invented new and useful Improvements in Cotton-Blocking Machines, of which the following is a specification.

My present invention has reference to a cotton blocking or checking device, and has for its primary object to produce an attachment for the beams of an ordinary cultivator whereby the said cultivator may be converted into a cotton checking machine in an easy manner and at a comparatively low expense.

A further object is to produce an attachment designed to be clamped on the beams of a cultivator and to support thereon, sweep or other shovels by the same means whereby such shovels are ordinarily supported on the beams of the cultivator.

It is a still further object to produce an attachment for cultivators, for converting a cultivator frame into a cotton checking device, in which the shovels may be longitudinally adjusted on the attachment, and also wherein auxiliary spindles are employed and arranged on the spindles of the cultivator axle whereby the wheels of the machine may be spaced a desired distance away from the outer shovels to permit of the shovels properly operating on the rows of cotton for checking the same.

Other objects and advantages will present themselves as the nature of the invention is better understood, reference being had to the drawings accompanying and forming part of this specification.

In the drawings:—

Figure 1 is a side elevation of a cultivator converted into a cotton checker in accordance with this invention.

Fig. 2 is a plan view thereof.

Fig. 3 is a sectional view approximately on the line 3—3 of Fig. 2.

Fig. 4 is a sectional view approximately on the line 4—4 of Fig. 2.

Fig. 5 is a perspective view of one of the clamps employed.

Fig. 6 is a similar view illustrating a modification.

In the drawings I have shown only a sufficient portion of a cultivator frame to illustrate the manner in which the same is converted into a cotton checking machine.

The cultivator frame is broadly indicated by the numeral 1 and the shovel carrying beams by the numeral 2. The shovels are, of course, removed from the beams when my improvement is attached thereto, and the wheels are also removed from the spindles of the arch axle 3. On the spindles of the axle I arrange auxiliary spindles 4 on which the ground wheels are journaled. These spindles 4 have their inner faces provided with sockets 5 in which the spindles of the axle 3 are snugly received, and the numeral 6 designates set screws that enter the socket 5 and bind against the spindles of the axles 3. It is to be noted that both of the auxiliary spindles are of a similar construction, and therefore either auxiliary spindle can be attached to either of the axle spindles.

On each of the beams 2 I support auxiliary beams 7. The beams 7 are in the nature of pipe members, so it will be noted that the same can be cheaply procured. The pipe members 7 are all of the same length, and two of the said pipe members are arranged in pairs parallel with and to the opposite side of each of the beams 2. The pairs of pipe members are connected to the beams by clamps which are broadly indicated by the numeral 8. Each of the clamps comprises two similarly constructed coöperating sections or members, each including a substantially rectangular body 9 provided at its outer corner with ears 10 which are arranged in pairs and which are spaced away from each other, and the spaces between the ears communicate with round openings 11 in the said body portions which receive therein the ends of the pipe members 7. Passing through the coöperating pairs of ears are bolts 12 that are engaged by nuts 13, and the adjustment of these nuts on the bolts draw the ears toward each other and bind in the openings 11 the rod 7.

The body members 9, on their inner and confronting ends are provided with longitudinally disposed semi-circular depressions 14 that receive therein the beams 2. The inner ends of the body portions of the clamp sections have outwardly extending flanges 15, and passing through the confronting flanges are bolts 16 that are engaged by nuts 17. In this manner it will be seen that the clamps 8 tightly engage with the beams 2, and also that the said clamps effectively support the auxiliary beams or pipe members 7.

On the auxiliary beams or pipe members are secured the clamps 18 that support the shanks 19 of shovels 20 in the same manner that the said shovels are ordinarily attached to the beams 2 of the cultivator 1.

With my improvement the shovels 20 may be adjusted longitudinally to the auxiliary beams or pipe members 7. The machine is designed to plow cotton crosswise, thus checking it so that it may plow in the same way again if necessary, and entirely dispenses with the laborious method of chopping the cotton.

From experience I have found that in this manner the machine does better work than chopping the cotton lengthwise in rows. The attachment may be manufactured at a minimum cost, and all of the parts constituting the same are similar and therefore interchangeable. With the improvement no gearing is employed and supporting devices are entirely dispensed with, only for the sweep shovels being employed, and the same may be adjusted so that the plants can be properly spaced, and as, of course, large or small sweep plows may be used. By employing the auxiliary spindles the wheels of the cultivator are so spread as to accommodate the increase capacity of the machine which is made possible by moving all the sweep plows up in a line with each other on the auxiliary beams.

It is believed that the foregoing description, when taken in connection with the drawings, will fully set forth to those skilled in the art to which such inventions relate, the simplicity and advantages of my construction.

In Fig. 6, I have shown the auxiliary beams 7' integrally formed at one of their ends with clamps 8'. The clamps have their confronting edges provided with an opening for the reception of the beam 2' and at the said edges they are also provided with outwardly extending longitudinally disposed flanges 15' through which are passed binding and securing means 16'.

Having thus described the invention, what I claim, is:—

In a means for converting a cultivator into a cotton checking machine, the combination with such cultivator; of spaced clamps on the beams thereof, each clamp including two mating sections depressed at the confronting ends thereof to receive the cultivator beams, adjustable securing means for the sections, auxiliary beams supported at the outer ends of the clamp sections, binding means between the clamp sections and said auxiliary beams, a longitudinally adjustable clamp on each of the auxiliary beams, and a sweep plow having its shank adjustably secured on each of the last mentioned clamps.

In testimony whereof I affix my signature.

BARNIE S. FORD.